United States Patent
Meyer et al.

(10) Patent No.: US 6,460,513 B1
(45) Date of Patent: Oct. 8, 2002

(54) METHOD TO ADAPT ENGINE FUEL CONTROL, BY MULTI-COMPONENT VAPORIZATION METHOD, TO ACTUAL VOLATILITY QUALITY OF FUEL

(75) Inventors: Daniel Lawrence Meyer, Dearborn, MI (US); David Karl Trumpy, Farmington Hills, MI (US); Soduk Lee, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/995,132

(22) Filed: Nov. 27, 2001

(51) Int. Cl.[7] .............................................. F02M 51/00
(52) U.S. Cl. ........................ 123/478; 123/480; 123/704
(58) Field of Search ................................. 123/478, 480, 123/704, 472, 445, 434

(56) References Cited

U.S. PATENT DOCUMENTS

| | | | |
|---|---|---|---|
| 5,121,732 A | 6/1992 | Benninger et al. | 123/672 |
| 5,178,121 A | 1/1993 | Kitajima et al. | 123/689 |
| 5,474,052 A | 12/1995 | Aquino et al. | 123/675 |
| 5,682,868 A | 11/1997 | Moraal | 123/682 |
| 5,875,759 A | 3/1999 | Meyer et al. | 123/339.19 |
| 5,957,994 A | 9/1999 | Meyer et al. | 701/110 |
| 6,003,496 A | * 12/1999 | Maloney | 123/480 |
| 6,067,965 A | 5/2000 | Trumpy et al. | 123/480 |

* cited by examiner

Primary Examiner—Bibhu Mohanty
(74) Attorney, Agent, or Firm—John F Buckert; Allan J. Lippa

(57) ABSTRACT

A system (12) and method for controlling the injection of fuel into a cylinder (14) of an internal combustion engine (10) are provided. The system (12) includes a fuel injector (22), a temperature sensor (48), and an electronic control unit (ECU) (50). The fuel is parsed into a plurality of components based on the boiling points of elements of the fuel. ECU (50) stores mass fraction values for each component relative to the total mass of a sample of the fuel along with vaporization rates for each component. These values are used by the ECU (50) to account for different vaporization rates among fuel elements. In accordance with the invention, ECU (50) is further configured to adjust the mass fraction values responsive to the combustion air-fuel ratio and the engine temperature to account for the different volatility characteristics of various fuels.

24 Claims, 2 Drawing Sheets

METHOD TO ADAPT ENGINE FUEL CONTROL, BY MULTI-COMPONENT VAPORIZATION METHOD, TO ACTUAL VOLATILITY QUALITY OF FUEL

FIELD OF THE INVENTION

This invention relates to systems and methods for fuel control in vehicle engines and, in particular, to a system and method for adapting engine fuel control based on the volatility quality of the fuel.

BACKGROUND OF THE INVENTION

A conventional vehicle having a fuel-injected internal combustion engine includes a system for controlling the amount of fuel injected into each cylinder of the engine during a combustion event. The amount of fuel is controlled to achieve an optimal air-fuel ratio in the cylinders and thereby reduce emissions of hydrocarbons (HC), carbon monoxide (CO) and nitrous oxides ($NO_x$). A fuel such as gasoline, however, includes more than two hundred (200) different hydrocarbon elements with many different boiling points. As a result, different elements in the fuel vaporize at different rates within the engine. Many conventional systems fail to account for this difference in vaporization rates. As a result, conventional systems fail to obtain an optimal air-fuel ratio-particularly during cold starts when the systems must operate using an open-loop control strategy because typical air-fuel measurement indicators such as oxygen sensors are not yet functional.

In commonly assigned U.S. Pat. No. 6,067,965, the entire disclosure of which is incorporated herein by reference, a system is disclosed in which the different vaporization rates of fuel elements are taken into account in controlling fuel injection in the engine. Once a desired combustion fuel quantity is determined, the system derives a desired fuel injection quantity based on the desired combustion fuel quantity and a previous fuel injection quantity. The prior fuel injection quantity is parsed into a plurality of components each having a mass fraction value and a vaporization constant based partly on engine temperature. An estimate of the mass of vapor produced is then obtained and is used to determine the desired fuel injection quantity. The disclosed system represents a significant improvement over conventional systems. The system does not, however, account for different fuel volatility characteristics. The volatility characteristics of gasoline provided to consumers varies widely depending upon a variety of factors such as geographic location and weather. For example, in the northern United States, fuels having a relatively high volatility are required during winter months when air temperatures are relatively cold in order to enable sufficient fuel vaporization for cold engine starts. During summer months when air temperatures are relatively warm, however, fuels having a relatively low volatility are required to prevent vapor lock resulting from premature fuel vaporization in the fuel delivery system. Because variations in fuel result in variable volatility and vaporization rates, assumptions regarding fuel volatility made in the disclosed system of U.S. Pat. No. 6,067,965 may result in a non-optimal air-fuel ratio.

There is thus a need for a system and method for controlling the injection of a fuel into a cylinder of an internal combustion engine that will minimize and/or eliminate one or more of the above-identified deficiencies.

SUMMARY OF THE INVENTION

The present invention provides a system and method for controlling injection of a fuel into a cylinder of an internal combustion engine. The fuel may be represented as a plurality of liquid components having different boiling points. Each component may include a single element of the fuel or more than one element of the fuel. For example, a component may include those elements of the fuel having boiling points within a specified range. Each component has a mass fraction value associated therewith. The mass fraction value corresponds to an estimate of the mass of the component relative to the total mass of the fuel (i.e. of all the components and/or elements).

A method in accordance with the present invention includes the step of determining a combustion air-fuel ratio for a previous combustion event in one of a first cylinder (i.e., the cylinder into which the fuel will be injected) and a second cylinder of the engine. The combustion air-fuel ratio may be determined using an exhaust oxygen sensor, for example. The method also includes the step of measuring a temperature of the engine. The method further includes the step of adjusting a plurality of the mass fraction values responsive to the combustion air-fuel ratio and the temperature to obtain a modified set of mass fraction values for the fuel. Finally, the method includes the step of providing the fuel to the first cylinder responsive to the modified set of mass fraction values.

A system in accordance with the present invention includes an oxygen sensor that generates an air-fuel ratio signal indicative of a combustion air-fuel ratio for a previous combustion event in one of a first cylinder and a second cylinder of the engine. The system further includes a temperature sensor that generates a temperature signal indicative of a temperature of the engine and a fuel injector. Finally, the system includes an electronic control unit (ECU) configured to adjust a plurality of the mass fraction values responsive to the combustion air-fuel ratio and the temperature to obtain a modified set of mass fraction values for the fuel. The ECU is further configured to provide the fuel to the first cylinder responsive to the modified set of mass fraction values.

The present invention represents an improvement as compared to conventional systems and method for controlling delivery of fuel to the engine cylinders. The inventive system and method are able to account for changes in fuel volatility characteristics by monitoring changing engine conditions and adjusting values representative of the fuel. As a result, the inventive system and method are more likely, as compared to conventional systems and methods, to maintain an optimal air-fuel ratio in the engine thereby reducing emissions and improving engine performance.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
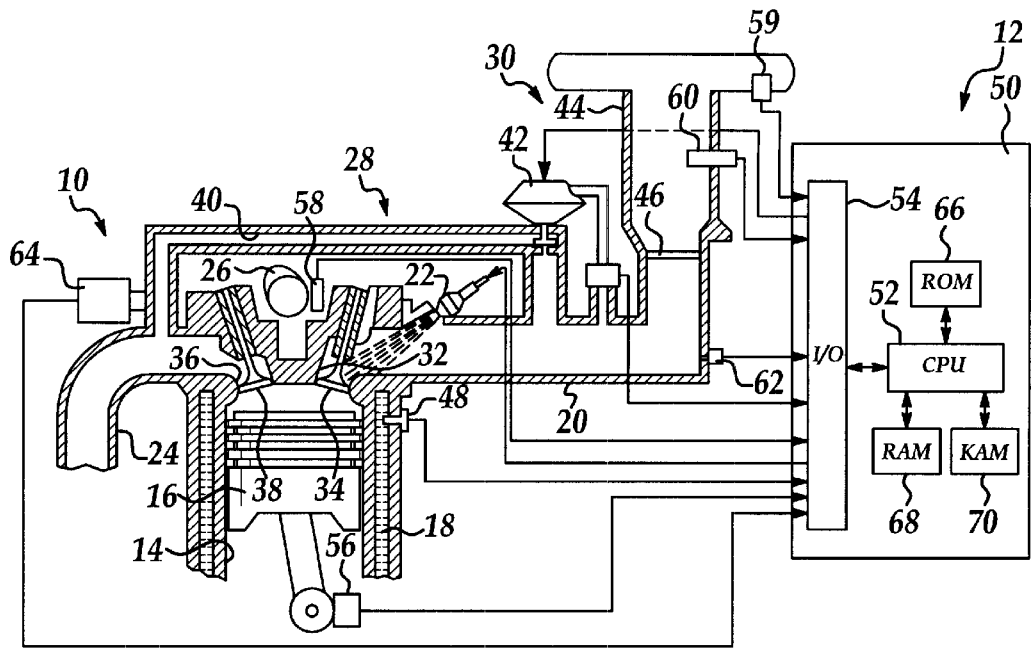
FIG. 1 is a schematic diagram illustrating an internal combustion engine incorporating a system for controlling injection of a fuel into a cylinder of the engine in accordance with the present invention.

Referring now to the drawings wherein like reference numerals are used to identify identical components in the various views, FIG. 1 illustrates an internal combustion engine 10 and a system 12 in accordance with the present invention for controlling injection of a fuel into a cylinder 14 of engine 10. The amount of fuel injected into cylinder 14 is controlled in order to maintain a desired air/fuel ratio and control emissions of hydrocarbons, carbon monoxide and nitrous oxides.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 14 and may also include a plurality of pistons 16, coolant passages 18, an intake manifold 20, fuel injectors 22, an exhaust manifold 24, a camshaft 26, an engine gas recirculation (EGR) system 28, and a throttle assembly 30.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention. A spark plug (not shown) may be disposed within each cylinder 14 to ignite the air/fuel mixture in the cylinder 14.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Intake manifold 20 provides a means for delivering charged air to cylinders 14. Manifold 20 is conventional in the art. An inlet port 32 is disposed between manifold 20 and each cylinder 14. An intake valve 34 opens and closes each port 32 to control the delivery of air and fuel to the respective cylinder 14.

Fuel injectors 22 are provided to deliver fuel in controlled amounts to cylinders 14 and are conventional in the art. Although only one fuel injector 22 is shown in the illustrated embodiment, it will again be understood that engine 10 will include additional fuel injectors for delivering fuel to other cylinders 14 in engine 10.

Exhaust manifold 24 is provided to vent exhaust gases from cylinders 14 after each combustion event. Manifold 24 is also conventional in the art and may deliver exhaust gases to a catalytic converter (not shown). An exhaust port 36 is disposed between manifold 24 and each cylinder 14. An exhaust valve 38 opens and closes each port 36 to control the venting of exhaust gases from the respective cylinder 14.

Camshaft 26 is provided to control the opening and closing of intake valves 34 and exhaust valves 38 in each of cylinders 14. Camshaft 26 is conventional in the art and may be controlled by an actuator (not shown) responsive to control signals generated by the vehicle's electronic control unit (ECU). It will be understood by those of skill in the art that separate camshafts 26 may be used to control the opening and closing of intake valves 34 and exhaust valves 38, respectively.

EGR system 28 is provided to return a portion of the exhaust gases to cylinders 14 in order to reduce emissions of combustion by-products. EGR system 28 includes a passage 40 that extends from exhaust manifold 24 to intake manifold 20 and an EGR valve 42 that may be disposed within passage 40 to control the delivery of recirculated exhaust gases to intake manifold 22.

Throttle assembly 30 controls the amount of air delivered to intake manifold 22 and cylinders 14. Assembly 30 is conventional in the art and may include a throttle body 44 and a throttle plate 46 disposed therein for regulating the amount of airflow through body 44 to manifold 22. It should be understood that assembly 30 may be electronically controlled.

System 12 is provided to control injection of fuel into cylinders 14. System 12 may form part of a larger system for controlling the air/fuel ratio in cylinders 14. System 12 may include fuel injector 22, a temperature sensor, such as engine coolant temperature sensor 48, and an electronic control unit (ECU) 50.

Temperature sensor 48 is provided to estimate engine temperature by measuring the temperature of the engine coolant in sleeves 18. Sensor 48 is conventional in the art and generates a temperature signal indicative of the temperature of engine 10. The temperature signal is input to ECU 50.

ECU 50 is provided to control engine 10. Unit 50 may comprise a programmable microprocessor or microcontroller or may comprise an application specific integrated circuit (ASIC). ECU 50 may include a central processing unit (CPU) 52 and an input/output (I/O) interface 54. Through interface 54, ECU 50 may receive a plurality of input signals including signals generated by sensor 48 and other sensors such as a profile ignition pickup (PIP) sensor 56, a cylinder identification (CID) sensor 58, an air temperature sensor 59, a mass air flow (MAF) sensor 60, a manifold absolute pressure (MAP) sensor 62, and a Heated Exhaust Gas Oxygen (HEGO) sensor 64. Also through interface 54, ECU 50 may generate a plurality of output signals including one or more signals used to control fuel injectors 22, camshaft 26, EGR valve 42, and the spark plugs (not shown) in each cylinder 14. ECU 50 may also include one or more memories including, for example, Read Only Memory (ROM) 66, Random Access Memory (RAM) 68, and a Keep Alive Memory (KAM) 70 to retain information when the ignition key is turned off.

Figure 2A:
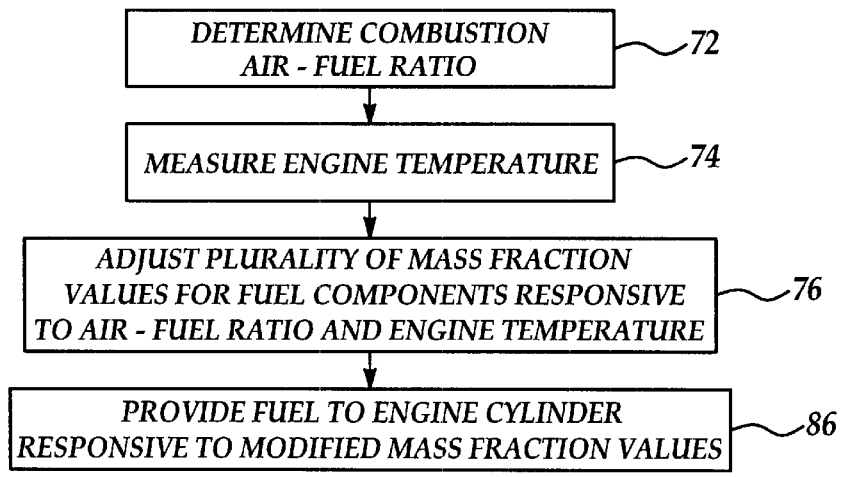
FIGS. 2A–2B are flow chart diagrams illustrating a method for controlling injection of a fuel into a cylinder of an internal combustion engine in accordance with the present invention.
Figure 2B:
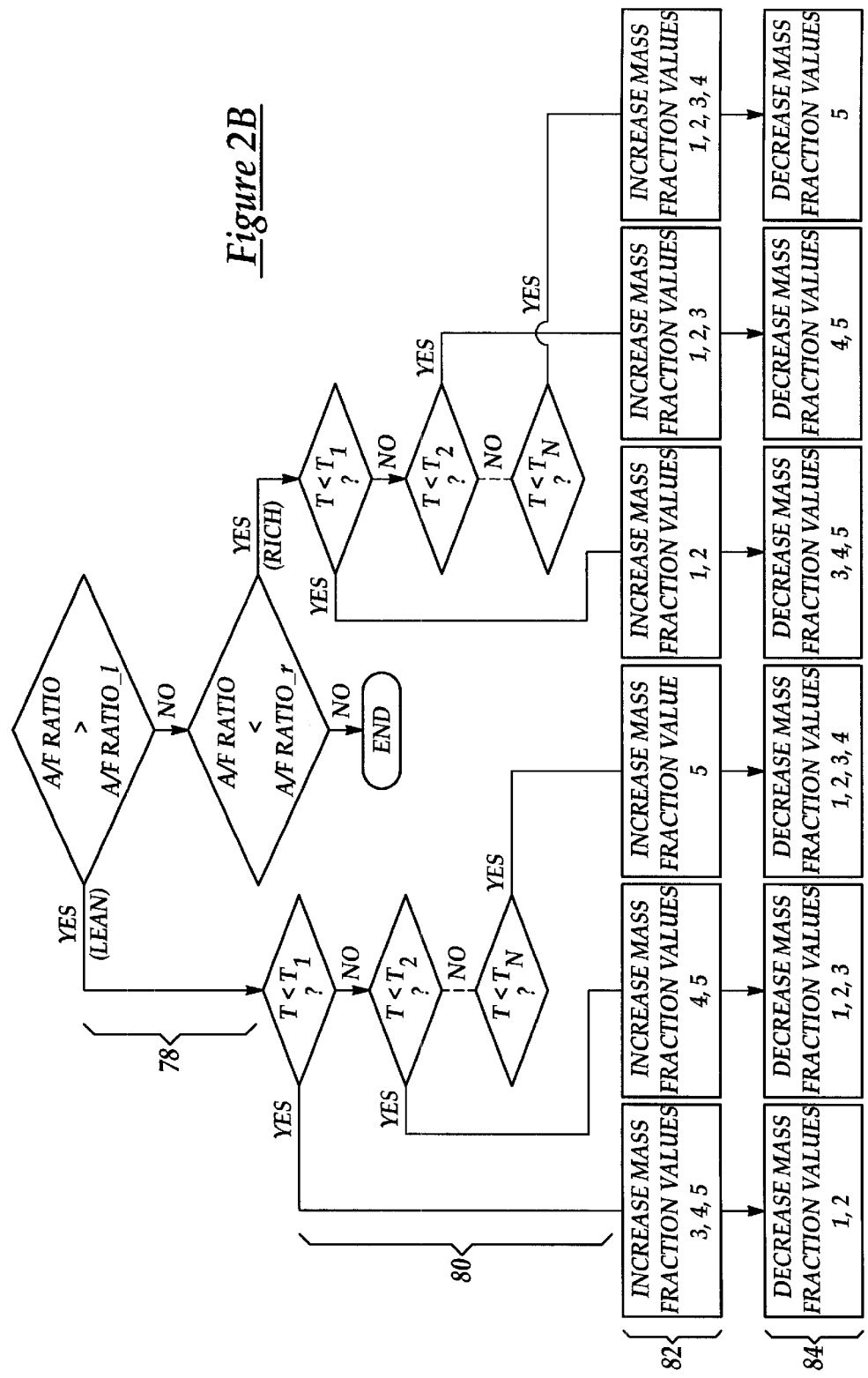

Referring now to FIGS. 2A–B, a method in accordance with the present invention for controlling injection of a fuel into cylinder 14 of engine 10 during a combustion event will be described in detail. As initially described in commonly assigned U.S. Pat. No. 6,067,965, the fuel may be parsed into a plurality of components in order to account for the different vaporization rates of the various fuel elements and more accurately control the air-fuel ratio. Each component may comprise one or more of the numerous hydrocarbon elements comprising a fuel such as gasoline and the components are defined with reference to the boiling points of the elements of the components. In one embodiment of the invention, various fuels are divided into five components. It should be understood, however, that the number of components may vary. Each component has a mass fraction value and a vaporization rate associated with the component.

The mass fraction value represents the fractional mass of the component relative to the mass of a sample of the fuel. The mass fraction values for the components may be determined using conventional chromatographic instruments. The following table summarizes estimated mass fraction values for several test fuels parsed into five components with component one (1) representing the lowest boiling point component and component five (5) representing the highest boiling point component:

| Gasoline Type | 1 | 2 | 3 | 4 | 5 |
|---|---|---|---|---|---|
| Indolene | 0.18 | 0.25 | 0.32 | 0.20 | 0.05 |
| California Reformulated | 0.17 | 0.38 | 0.24 | 0.17 | 0.04 |
| "AMOCO" ® Summer Premium | 0.17 | 0.40 | 0.19 | 0.17 | 0.07 |
| Hesitation Gasoline | 0.15 | 0.24 | 0.23 | 0.29 | 0.09 |
| Cold-Start Winter Gasoline | 0.26 | 0.29 | 0.21 | 0.17 | 0.07 |

The values are based on the boiling point composition of unweathered fuels. Mass fraction values for typical consumer fuels may be obtained in a similar manner and stored in a memory, such as memory 70.

As set forth in U.S. Pat. No. 6,067,965, ECU 50 can, in one embodiment of the inventive method disclosed in U.S. Pat. No. 6,067,965, use the mass fraction values to determine the mass of each liquid component in cylinder 14 resulting from injection of an estimated fuel injection quantity (which may be derived from a previous fuel injection quantity for a cylinder 14 of engine 10) as follows:

$$\text{Mass\_}L(i) = \text{Mass\_}L\_p(i) + injfq \cdot fl(i), \text{for } i=1\text{--}5$$

where Mass_L_p(i) represents the mass for the liquid component i for the previous injection event for the same cylinder 14, injfq represents the estimated fuel injection quantity, and fl(i) represents the mass fraction for the liquid component i.

Each component of the fuel also has a vaporization rate associated with the component. The vaporization rate for each component may be determined responsive to the temperature of engine 10 as described in greater detail in U.S. Pat. No. 6,067,965. During very cold engine temperatures, there is likely to be a considerable delay in vaporization of all of the components. As the temperature of engine 10 increases, the lowest boiling point components will be completely vaporized during a combustion event and only the highest boiling points components will have a delay in vaporization. If the temperature of engine 10 reaches a certain relatively high level, all components will be completely vaporized during a combustion event.

Again as set forth in U.S. Pat. No. 6,067,965, ECU 50 may be configured, or encoded, in one embodiment of the inventive method disclosed in U.S. Pat. No. 6,067,965 to use the vaporization rate to determine the vapor mass resulting from a combustion event as follows:

$$M\text{vap\_}L(i) = V\text{rate\_}L(i) \cdot \text{Mass\_}L(i), \text{for } i=1\text{--}5$$

where Vrate_L(i) is the vaporization rate for a component i. The vapor mass for the various components may be summed together to obtain a total vapor mass Mvap_tot during a combustion event.

Knowing the total vapor mass generated by injection of a quantity of fuel and a desired combustion fuel quantity cmbfq (obtained in response to the mass of air inducted into engine 10), ECU 50 can determine a corrective ratio Mvap_ratio as follows:

$$M\text{vap\_ratio} = \frac{cmbfq}{M\text{vap\_tot}}$$

If the corrective ratio is greater than one (1), the air-fuel ratio is lean, and more fuel must be injected than was previously estimated. If the corrective ratio is less than one (1), the air-fuel ratio is rich, and less fuel must be injected than was previously estimated. The corrective ratio may be multiplied by the estimated fuel injection quantity as follows to determine a new estimated fuel injection quantity. The inventive method disclosed herein improves on the method disclosed in U.S. Pat. No. 6,067,965, because the inventive method enables adjustment of the mass fraction values associated with the various fuel components. Adjustments to the mass fraction values reflect changes in the volatility characteristics of the fuels being used in engine 10 and will therefore result in more accurate control of the air-fuel ratio in engine 10. The inventive method or algorithm may be implemented by system 12 wherein ECU 50 is configured to perform several steps of the method by programming instruction or code (i.e., software). The instructions may be encoded on a computer storage medium such as a conventional diskette or CD-ROM and may be copied into one of memories 66, 68, 70 of ECU 50 using conventional computing devices and methods.

Referring again to FIG. 2A, the method may begin with the step 72 of determining a combustion air-fuel ratio for a previous combustion event in one of the cylinders 14. The cylinder 14 may comprise the same cylinder into which fuel is to be injected or another cylinder of engine 10. Referring to FIG. 1, oxygen sensor 64 may generate a signal indicative of the combustion air-fuel ratio and input the signal to ECU 50. ECU 50 then determine the combustion air-fuel ratio in a conventional manner responsive to the signal.

Referring again to FIG. 2A, the inventive method may continue with the step 74 of measuring a temperature of engine 10. Referring to FIG. 1, the temperature may be measured in a conventional manner using temperature sensor 48. Sensor 48 generates a temperature signal indicative of the engine coolant temperature and the signal is input to ECU 50.

Referring again to FIG. 2A, the inventive method continues with the step 76 of adjusting a plurality of the mass fraction values associated with the fuel components in response to the combustion air-fuel ratio and the temperature to thereby obtain a modified set of mass fraction values for the fuel components. The plurality of the mass fraction values may comprise all of the mass fraction values or a subset of all of the mass fraction values. As illustrated in FIG. 2B, step 76 may contain several substeps. It should be understood, however, that the particular substeps illustrated in FIG. 2B represent only one embodiment of the invention and that the substance and number of substeps may vary without departing from the scope of the present invention.

Step 76 may begin with the substep 78 of determining whether the combustion air-fuel ratio A/F ratio is indicative of a lean air-fuel mixture or a rich air-fuel mixture. ECU 50 may compare the combustion air-fuel ratio A/F ratio to predetermined thresholds A/F ratio_l and A/F ratio_r for a lean air-fuel ratio and a rich air-fuel ratio, respectively. If the comparisons reveal that the measured combustion air-fuel ratio is within a predefined acceptable range, the routine may end and the mass fraction values will remain unchanged.

Step 76 may continue with the substep 80 of comparing the measured temperature to a plurality of predetermined temperature ranges. For example, substep 80 may include successive comparisons of the measured temperature T to successively higher temperature values $T_1, T_2, \ldots T_N$. Because the temperature of engine 10 directly affects the vaporization rates of the components of fuel, the temperature is used to control the adjustments made to the mass fraction values in response to a determination that the air-fuel mixture is lean or rich. It should again be understood, that the embodiment of the inventive method illustrated in FIG. 2B is exemplary only and the temperature comparisons reflected in substep 80 may take place either before or after the air-fuel ratio comparisons reflected in substep 78.

Step 76 may continue with the substeps 82, 84 of increasing one or more of the mass fraction values and decreasing one or more of the mass fraction values. Because the mass fraction values total one (1.0), an increase in one mass fraction value should result in a corresponding decrease in another mass fraction value. As a general rule, if the air-fuel mixture is lean, the mass fraction values of higher boiling point components are increased while those of lower boiling point components are decreased. Conversely, if the air-fuel mixture is rich, the mass fraction values of lower boiling point components are increased while those of higher boiling point components are decreased. Substeps 82, 84 will be formed in each temperature range, but identity and number of mass fraction values that are increased or decreased will vary responsive to the temperature range in which the engine temperature falls. The particular examples illustrated in FIG. 2 for substeps 82, 84 are exemplary only.

Substeps 82, 84 may each include several substeps of their own. In one embodiment of the invention, the mass fraction in values are increased or decreased in a stepwise manner by adding or subtracting a predetermined value from the current mass fraction values to obtain modified values. These modified values and then compared to corresponding predetermined maximum (in the case of an increase) or minimum (in the case of a decrease) mass fraction values for each component. ECU 50 may be configured, or encoded to perform these substeps and may be further configured in a variety of ways (e.g., returning to the original mass fraction value, limiting the modified value to the maximum and minimum while making corresponding adjustments to other values, etc.) to make appropriate corrections in the event the maximum or minimum values are exceeded. The following table summarizes one potential estimate for the maximum and minimum mass fraction values in the case of a five component parsing:

| Component | Maximum Mass Fraction Value | Minimum Mass Fraction Value |
| --- | --- | --- |
| 1 | 0.30 | 0.05 |
| 2 | 0.45 | 0.20 |
| 3 | 0.35 | 0.15 |
| 4 | 0.30 | 0.10 |
| 5 | 0.10 | 0.02 |

As mentioned hereinabove, in step 76 a plurality of the mass fraction values are adjusted and the plurality may comprise subset of the total number of mass fraction values or all of the mass fraction values. In a second embodiment of the invention, all of the mass fraction values are adjusted by an amount equal to a percentage of a difference between a first fuel having a first volatility characteristic and a second fuel having a second volatility characteristic. As illustrated in the following table, the mass fraction values may be expressed as a percentage of the difference between a first fuel having an optimal volatility characteristic (i.e. "Best Fuel") and a second fuel having a worst case volatility characteristic (i.e. "Worst Fuel"):

| | 1 | 2 | 3 | 4 | 5 | Sum |
| --- | --- | --- | --- | --- | --- | --- |
| Best Fuel | 0.200 | 0.400 | 0.190 | 0.160 | 0.050 | 1.000 |
| 60% of Best | 0.160 | 0.320 | 0.246 | 0.208 | 0.066 | 1.000 |
| Worst Fuel | 0.100 | 0.200 | 0.330 | 0.280 | 0.090 | 1.000 |

If the combustion air-fuel ratio indicates a rich air-fuel mixture, the mass fraction values are adjusted in substeps 82, 84 in a percentage step-wise manner to move the values closer to mass fraction values for the "Best Fuel" (e.g., to 70% of Best). Conversely, if the combustion air-fuel ratio indicates a lean air-fuel mixture, the mass fraction values are adjusted in substeps 82, 84 in a percentage step-wise manner to move the values closer to mass fraction values for the "Worst Fuel." The mass fraction values for the "Best" and "Worst" fuels, along with the mass fraction values as currently determined by ECU 50 for the current fuel, may be stored in memory 70 for each of a plurality of temperature ranges.

Referring again to FIG. 2A, the inventive method may finally include the step 86 of providing the fuel to the cylinder 14 responsive to the modified set of mass fraction values. One method of providing the fuel to cylinder 14 is set forth in U.S. Pat. No. 6,067,965. In particular, and as described in greater detail both hereinabove and in U.S. Pat. No. 6,067,965, the mass fraction values may be used with an estimated fuel injection quantity to determine the liquid mass of each component of the fuel in the cylinder 14. The liquid mass of each component may be multiplied by a corresponding vaporization rate to determine the vapor mass of each component in cylinder 14. The total vapor mass may then be used with the already determined desired combustion fuel quantity (determined in response to the air mass flow into engine 10) to obtain a corrective ratio. The corrective ratio may then be multiplied by the estimated fuel injection quantity to obtain a corrected fuel injection quantity for input into cylinder 14. It should be understood, however, that this method is illustrative only and that the mass fraction values and resulting vapor mass could be used in a variety of ways (including both open loop and closed loop strategies as discussed in U.S. Pat. No. 6,067,965) to provide fuel to cylinder 14.

It should be noted that a direct measurement of the combustion air-fuel ratio may not be available during a cold start because conventional oxygen sensors may not function properly until engine 10 reaches a predetermined temperature. Accordingly, ECU 50 may initially apply an anti-stall algorithm upon startup until the engine temperature reaches a predetermined value. The algorithm may, for example, result in adjustment of the mass-fraction values for various fuel components to decrease the total calculated vapor mass and thereby cause injection of greater amounts of fuel.

The present invention represents a significant improvement as compared to conventional systems and methods for controlling injection of fuel into engine cylinders. The inventive method not only accounts for varying vaporization rates among fuel components (as in U.S. Pat. No. 6,067,965), but further accounts for changes in fuel volatility resulting from changes in fuel by consumers. As a result, the inventive system and method enable more accurate control of the air-fuel ratio in the engine.

We claim:

1. A method for controlling injection of a fuel into a first cylinder of an internal combustion engine during a combustion event, said fuel including a plurality of liquid components having different boiling points and each component having a mass fraction value associated therewith, said method comprising the steps of:

determining a combustion air-fuel ratio for a previous combustion event in one of said first cylinder and a second cylinder of said engine;

measuring a temperature of said engine;

adjusting a plurality of said mass fraction values responsive to said combustion air-fuel ratio and said temperature to obtain a modified set of mass fraction values for said fuel; and, providing said fuel to said first cylinder responsive to said modified set of mass fraction values.

2. The method of claim 1 wherein each component of said fuel is comprised of multiple elements in said fuel having boiling points within a predetermined range.

3. The method of claim 1 wherein said adjusting step includes the substep of determining whether said combustion air-fuel ratio is indicative of a lean air-fuel mixture or a rich air-fuel mixture.

4. The method of claim 1 wherein said adjusting step includes the substep of comparing said temperature to a plurality of predetermined temperature ranges.

5. The method of claim 1 wherein said adjusting step includes the substeps of:

increasing a first mass fraction value of said plurality of mass fraction values; and, decreasing a second mass fraction value of said plurality of mass fraction values.

6. The method of claim 5 wherein said increasing substep includes the substeps of:

adding a predetermined value to said first mass fraction value to obtain a modified first mass fraction value; and, comparing said modified first mass fraction value to a corresponding predetermined maximum mass fraction value.

7. The method of claim 1 wherein said plurality of mass fraction values comprises all of said mass fraction values.

8. The method of claim 1 wherein said plurality of mass fraction values are adjusted by an amount equal to a percentage of a difference between a first fuel having a first volatility characteristic and a second fuel having a second volatility characteristic.

9. A system for controlling injection of a fuel into a first cylinder of an internal combustion engine during a combustion event, said fuel including a plurality of liquid components having different boiling points and each component having a mass fraction value associated therewith, said system comprising:

a temperature sensor that generates a temperature signal indicative of a temperature of said engine;

a fuel injector; and, an electronic control unit configured to determine a combustion air-fuel ratio for a previous combustion event in one of said first cylinder and a second cylinder of said engine, to adjust a plurality of said mass fraction values responsive to said combustion air-fuel ratio and said temperature to obtain a modified set of mass fraction values for said fuel and to control said fuel injector to provide said fuel to said first cylinder responsive to said modified set of mass fraction values.

10. The system of claim 9 wherein each component of said fuel is comprised of multiple elements in said fuel having boiling points within a predetermined range.

11. The system of claim 9 wherein said electronic control unit is further configured, in adjusting said plurality of said mass fraction values, to determine whether said combustion air-fuel ratio is indicative of a lean air-fuel mixture or a rich air-fuel mixture.

12. The system of claim 9 wherein said electronic control unit is further configured, in adjusting said plurality of said mass fraction values, to compare said temperature to a plurality of predetermined temperature ranges.

13. The system of claim 9 wherein said electronic control unit is further configured, in adjusting said plurality of said mass fraction values, to increase a first mass fraction value of said plurality of mass fraction values and to decrease a second mass fraction value of said plurality of mass fraction values.

14. The system of claim 13 wherein said electronic control unit is further configured, in increasing said first mass fraction value, to add a predetermined value to said first mass fraction value to obtain a modified first mass fraction value and to compare said modified first mass fraction value to a corresponding predetermined maximum mass fraction value.

15. The system of claim 9 wherein said plurality of mass fraction values comprises all of said mass fraction values.

16. The system of claim 9 wherein said plurality of mass fraction values are adjusted by an amount equal to a percentage of a difference between a first fuel having a first volatility characteristic and a second fuel having a second volatility characteristic.

17. An article of manufacture, comprising:

a computer storage medium having a computer program encoded therein for controlling injection of a fuel into a first cylinder of an internal combustion engine during a combustion event, said fuel including a plurality of liquid components having different boiling points and each component having a mass fraction value associated therewith, said computer program including:

code for determining a combustion air-fuel ratio for a previous combustion event in one of said first cylinder and a second cylinder of said engine;

code for determining a temperature of said engine;

code for adjusting a plurality of said mass fraction values responsive to said combustion air-fuel ratio and said temperature to obtain a modified set of mass fraction values for said fuel; and, code for controlling a fuel injector to provide said fuel to said first cylinder responsive to said modified set of mass fraction values.

18. The article of manufacture of claim 17 wherein each component of said fuel is comprised of multiple elements in said fuel having boiling points within a predetermined range.

19. The article of manufacture of claim 17 wherein said code for adjusting said plurality of said mass fraction values includes code for determining whether said combustion air-fuel ratio is indicative of a lean air-fuel mixture or a rich air-fuel mixture.

20. The article of manufacture of claim 17 wherein said code for adjusting said plurality of said mass fraction values includes code for comparing said temperature to a plurality of predetermined temperature ranges.

21. The article of manufacture of claim 17 wherein said code for adjusting said plurality of said mass fraction values includes code for increasing a first mass fraction value of said plurality of mass fraction values and for decreasing a second mass fraction value of said plurality of mass fraction values.

22. The article of manufacture of claim 17 wherein said code for increasing said first mass fraction value includes code for adding a predetermined value to said first mass fraction value to obtain a modified first mass fraction value and code for comparing said modified first mass fraction value to a corresponding predetermined maximum mass fraction value.

23. The article of manufacture of claim 17 wherein said plurality of mass fraction values comprises all of said mass fraction values.

24. The article of manufacture of claim 17 wherein said plurality of mass fraction values are adjusted by an amount equal to a percentage of a difference between a first fuel having a first volatility characteristic and a second fuel having a second volatility characteristic.

* * * * *